Feb. 6, 1968 C. D. SKIRVIN 3,368,107

OSCILLATOR CIRCUIT

Filed May 17, 1965

INVENTOR.
CLIFFORD D. SKIRVIN
By Smyth, Roston & Pavitt
ATTORNEYS.

United States Patent Office 3,368,107

Patented Feb. 6, 1968

3,368,107

OSCILLATOR CIRCUIT

Clifford D. Skirvin, Pomona, Calif., assignor to Microdot, Inc., Pasadena, Calif., a corporation of California Continuation-in-part of application Ser. No. 274,537, Apr. 22, 1963. This application May 17, 1965, Ser. No. 456,460

18 Claims. (Cl. 315—209)

ABSTRACT OF THE DISCLOSURE

This invention relates to a system for using a direct voltage to illuminate a luminescent tube. The invention includes an electrical system for producing a voltage with a considerable amount of harmonics at high frequencies to illuminate the tube. The electrical circuitry includes a reactance such as a transformer which is connected to the source of direct voltage and to a first switching member such as a transistor to produce a state of conductivity in the transistor. During the state of conductivity in the transistor, a reactance such as a capacitor becomes charged. When the charge in the capacitor reaches a particular level, a second switching member such as a diode becomes conductive. The diode is connected to the transistor to bias the transistor to a state of non-conductivity when the diode becomes conductive. In this way, the transistor becomes alternately conductive and non-conductive.

During the time that the transistor is conductive, current flows through the primary of the transformer and through the secondary of the transformer. Since the luminescent tube is connected to the secondary of the transformer, current also flows through the luminescent tube during this period. The transformer accumulates energy during this period and releases this energy by a continued flow of current through the luminescent tube when the transistor subsequently becomes non-conductive.

This is a continuation-in-part application of Ser. No. 274,537, filed Apr. 22, 1963, by me, now abandoned. This invention relates generally to direct current (DC) to alternating current (AC) converters or oscillators of a type useful in energizing fluorescent and gas-tube light sources and other utilization devices, and more particularly concerns a novel low-power, high efficiency oscillator utilizing a single transistor or other active switching element. As will appear, the invention provides transistor interelectrode circuits that are essentially free of resistance, a very important feature in the many situations where a utilization device must be powered from a low battery supply voltage ranging as low as one or two volts. Because the inventive oscillator circuit was developed initially for use in the lighting field, its operation and advantages will be given specifically by relating them to lighting circuitry. However, a low-loss, small-battery-voltage oscillator will prove an important addition in many other fields where either miniaturization, weight-saving, or low cost is a criterion.

In the most efficient practice of fluorescent or luminescent gas tube lighting, the excitation current supplied to the fluorescent tube is some form of AC. If the source of power for the tube is DC, as with any hand light, automobile light, or other battery-operated system, a DC to AC converter (or "inverter" or oscillator) must be used between the DC and the tube. In addition to the inverter, of course, the usual ballast and starter circuitry will intervene. Accordingly, up to the present, the complexity, bulkiness, and high power dissipation of such a DC powered gas tube lighting system has prevented its replacing the incandescent lighting applied so widely in flashlights and vehicle lighting, even though incandescent bulbs have poorer illumination properties (e.g.—color, penetration) and light output (lumens output per watt of power input, known as the efficacy or "Q") than do fluorescent or other luminescent tubes. The efficacy of luminescent tubes is many times greater than that of incandescent, and the light output is white (rather than incandescent red), resulting in better penetrating power and brighter illumination. However, luminescent tubes require a high voltage AC excitation input, heretofore not conveniently derivable from small portable batteries.

One immediate object of the present invention, therefore, is to provide a DC–AC converter which is usable to power luminescent lamps from small batteries without overly increasing the bulk, weight, cost, or power consumption of the lighting system. Thus, applicant's DC–AC converter eliminates the need for separate ballast or starter equipment and can derive adequate AC voltage for the luminescent tube from the smallest commercially used batteries, down to 1 or 2 volts DC. The broad object of the invention is, of course, to provide a low-loss oscillator circuit which can use one to two-volt batteries and still operate with acceptable efficiency, in spite of the unavoidable voltage loss which must occur in the oscillator active switching element (0.3 volt for germanium transistors; 0.7 volt for silicon transistors) and in the oscillator transformer.

According to the principles of the instant invention, the luminescent tube or other utilization device to which the oscillator circuit is to supply AC power is connected across the secondary of an output transformer of very critical design. One feature of the output transformer is its use of a ferrite core with primary and secondary windings coaxial and as closely coupled to one another as possible. As another feature of the invention, neither the primary nor the secondary of the transformer is grounded; rather, both are left "floating," so that either end can take on high instantaneous voltages under the influence of transients and so that the stray capacitance between the transformer windings is not decoupled to ground. Thus, in the secondary circuit of the transformer, the secondary inductance, stray capacitance and other reflected impedance together with the resistance of the tube combine to form a resonant circuit when excited by AC input signals. Since the stray capacitance in the secondary of the transformer and the transformer inductance are the only reactive components in the resonant circuit (the lighting tubes being almost purely resistive), changes in the lighting intensity of the tube from that providing the dimmest illumination to the maximum possible will alter the "Q" of the resonant circuit, but will not throw it out of resonance. Thus, the specific characteristics of the transformer of the inventive circuit constitute a strong factor in determining the frequency of the AC supplied to the tube or other utilization device.

Another feature of applicant's invention is its production of a non-symmetrical waveshape in the output excitation signal supplied to the luminescent tube. Such wave-forms are far more efficient in terms of lumens light output per watt power input than are pure or "clean" sinewaves. This results in part from the fact that the non-symmetrical waveshape of applicant's signal causes high frequency harmonics to be produced and that these high frequency harmonics facilitate the illumination of the tube because of the resonant characteristics of the tube.

Still another feature of applicant's invention is its provision of means for using transient voltage swings far in excess of the basic DC supply voltage, both at the terminals of the free-floating transformer and at the electrodes of the switching device. These transients are induced mainly by sharp switching of the oscillator switching device through the action of the transformer. However, it will be appreciated that other components including a transistor operating as a switch, a capacitor and a unidirectional device such as a diode acting as a biasing member for the transistor operate in conjunction with the transformer to produce the desired waveform.

Another feature of applicant's invention is the use in series with the primary of the transformer of the capacitor, which accumulates charge under the influence of switching transients of amplitude far in excess of the basic supply voltage amplitude and then operates in conjunction with the energy stored in the transformer to create added currents and controlled current swings in the output transformer primary. Another feature is the use of the transistor to provide for a flow of current in accordance with the voltage swings in the transformer and the use of the diode to bias the transistor toward a state of non-conductivity after the transistor has been made conductive by the voltage swings in the transformer.

Another feature of the invention is the principle of using a gas tube in its most favorable alignment for non-sinewave AC excitation, and still other principles appear in the use of the oscillator in miniature lamp design.

Thus, applicant's inventive principles provide oscillation even though the transistor interelectrode circuits are essentially free of resistance other than that associated with the above-recited reactance and active elements in said circuits. In the lighting field, this particular simple, yet novel, development has been found to provide circuits of remarkably high efficiency, on the order of 72% to 78%, for the particular component values given below, whereas prior lighting circuits have had at best efficiencies on the order of 55%.

Other features of the invention include the provision of a fluorescent or neon tube as the light source in the circuit, the connection of the inductive coupling in series with the input winding of the transformer, and the connection of the negative and positive terminals of the DC source with an intermediate tap of the transformer input winding and with the transistor emitter, respectively. Finally, the invention may be considered to extend to the sub-combination defined by the oscillator portion of the circuit, including the DC source, the transistor interelectrode circuits and the transformer.

These and other features and advantages of the invention will be more clearly understood from the following detailed description of a typical embodiment of which:

Figure 1:
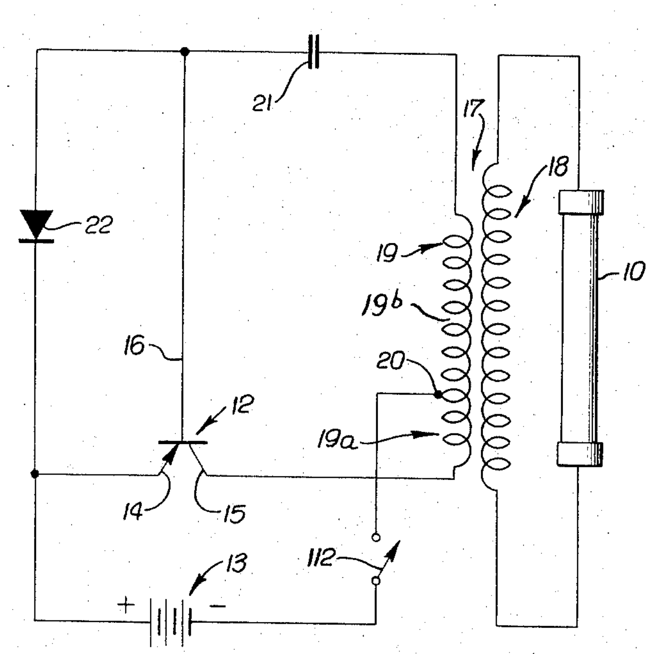
FIGURE 1 is a circuit diagram illustrating schematically the overall light circuit.
Figures 2, 3:
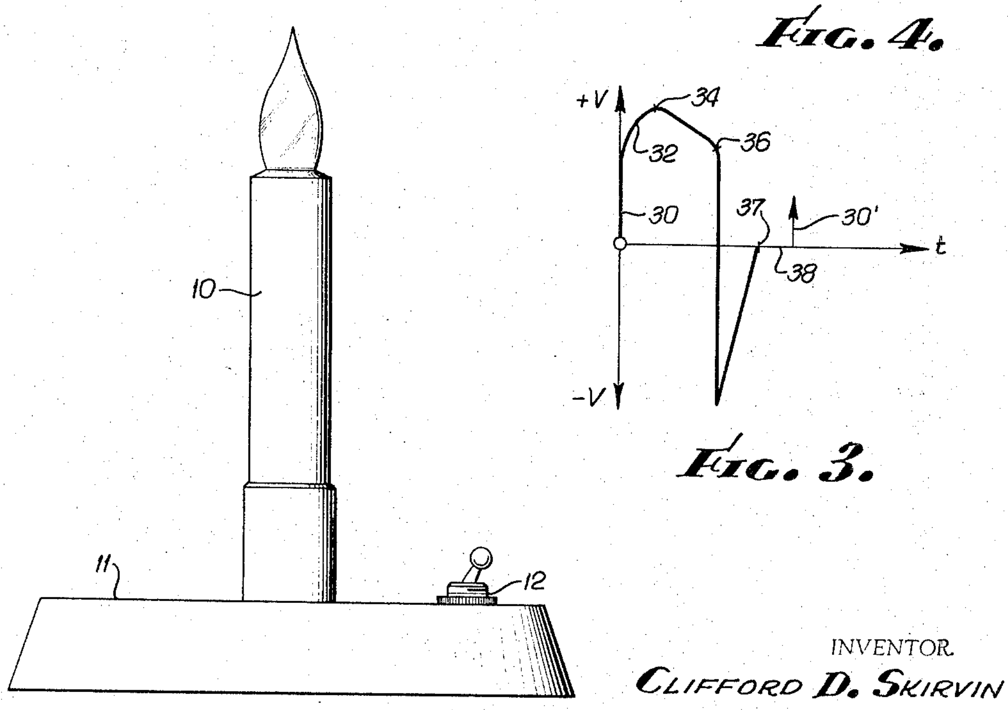
FIGURE 2 illustrates a battery-operated table lamp incorporating the invention.
FIGURE 3 shows, in time-voltage coordinates, the waveform produced by the circuit of FIGURE 1.

Referring to FIGURE 1, the circuit illustrated therein comprises an AC responsive light or luminescent source 10 such as a fluorescent or neon tube which is adapted to glow when energized, typically at between 296 and 450 volts. FIGURE 2 shows the tube 10 projecting upwardly from a base 11 in which the remainder of the circuit is housed. The lamp of FIGURE 2 has an "on-off" switch 27 on the base 11; the switch 27 is also illustrated in the circuit diagram of FIGURE 1. Typically, but not necessarily, the nominal input frequency to the tube 10 is about 25 kilocycles; however, the frequency output of the circuit of FIGURE 1 considered as an oscillator may vary widely, for example, from 60 to 100,000 cycles. In lighting, however, the frequency should be above the audio range to avoid annoying buzz; and in practice, 1,500 c.p.s. to 30 kilocycles has proved the most satisfactory range.

Referring again to FIGURE 1, the circuit therein includes a switching device 112, selected for purposes of illustration as being a transistor of PNP type having emitter 14, collector 15, and base 16. A DC source such as a battery 13 having positive and negative terminals has its positive terminal directly coupled to the emitter 14. The negative terminal of the DC source is coupled to a first terminal of the switch 112. The circuit also includes a step-up transformer 17 having a secondary 18 and a primary 19. The secondary 18 is coupled across the electrodes of the luminescent tube 10. A first end 19*a* of the primary 19 is directly connected to the collector 15. A tap 20 on the primary 19 is connected to the second terminal of the switch 112. A second end 19*b* of the primary 19 is coupled through a capacitor 21 to the base 16 of the transistor 12. Since the design details of the transformer 17 can be very critical in achieving desirable results, the primary and secondary should be wound as close together as possible around a ferrite core, so that coupling is maximal and phase lag and core losses minimal. The relative number of turns of primary and secondary determines the voltage step-up, while the type wire, the core cross section, and core material all affect the frequency of the oscillator. One such transformer, for example, had a secondary 18 of 1385 turns of #28 wire, a primary 19 having #26 wire, 16 turns in portion 19*a* and 28 turns in portion 19*b*, and a core with 0.331 inch cross section of Allen-Bradley W03 (or Indiana General Corp. 05) ferrite.

A diode 22 between the base 16 and the positive terminal of the power supply 13 provides a discharge path for the charging capacitor 21 whenever the base 16 is raised above a certain voltage. If this diode 22 is a silicon diode, with 0.7-volt drop across its electrodes when it is conducting, its performance in parallel with the emitter-base "diode" of a germanium transistor at 12 will be particularly advantageous; for conduction of the diode forces the voltage on the base 16 to be at least 0.4-volt higher than the voltage on the emitter 14, so that the transistor 12 will tend to become cut off after the diode 22 has become conductive.

It should be noted that the capacitor 21 discharges every half-cycle, so that it should not be of any electrolytic or otherwise polarized variety. As will be shown below, its performance and function are unique in the inventive circuit in that it has less regulatory effect on output frequency than is usually the case, but instead controls the amount of power delivered through the transformer 17 by the conduction of the transistor 12.

In the operation of the above-described circuit, when the switch 112 is closed, the tap 20 on the primary 19 takes on the negative voltage of the negative terminal of the power supply 13 and the transistor 12 begins to conduct, especially since the portion 19*b* of the primary 19 introduces a negative voltage to the base of the transistor 12 because of the auto-transformer action of the primary. The auto-transformer action of the primary 19 causes a voltage surge to be produced across the primary 19, as indicated at 30 in FIGURE 3. This voltage surge may cause a voltage having an amplitude several times greater than the voltage from the battery 13 to be produced across the primary 19 and to be introduced between the emitter and collector of the transistor 12. The current path when the transistor 12 is in the conductive or "on" state is from the positive terminal of the power supply 13, through the transistor 12, through the portion of the primary 19 labeled 19*a* (from its first end to the tap 20), and finally through the closed switch 112 to the negative terminal of the power supply 13. Although the transistor 12 remains conductive for a time after the initial interval 30, the conductive slope of the transistor is negative because of the charge accumulating in the capacitor 21 by the flow of current through the capacitor and because of the reverse bias provided by the diode 22 to prevent the flow of current through the diode. The production across the primary 19 of a voltage with a negative slope is indicated at 34 in FIGURE 3.

The current flow in the portion 19*a* of the transformer 17 induces current flow both in the secondary 18 and in the portion 19*b* of the primary 19. Thus, current begins to flow through the capacitor 21 and the base and the collector of the transistor 12 to the tap 20 from the portion 19*b* of the primary 19. As current flows through the capacitor 21, the capacitor begins to charge, acquiring a positive voltage on the plate coupled to the base 16, which is the control electrode of the transistor 12. This causes the diode 22 to become conductive when the change in the capacitor 21 reaches a particular value since the voltage on the plate of the diode reaches a particular positive potential relative to the potential on the cathode of the diode corresponding to that which is produced when the diode becomes conductive. When a silicon diode is used, the voltage drop between the plate and cathode of the diode may be 0.7 volt in the conductive state of the diode. The voltage drop occurs because of the discharge of the capacitor 21 through a circuit including the capacitor, the diode 22, the emitter and collector of the transistor 12 and the primary winding 19. This voltage tends to make the base of the transistor 12 positive with respect to the emitter of the transistor and accordingly tends to bias the transistor toward a state of non-conductivity.

At the end of the negatively sloping portion 34, the transistor 12 becomes non-conductive because the capacitor 21 starts to discharge through the diode 22 as described above. However, the electromotive force in the transformer 17 acts to oppose any change in conductivity of the circuit including the primary 19 and the transistor 12. This causes the primary 19 to provide a voltage surge in a negative direction, as indicated at 36 in FIGURE 3. This voltage surge is instrumental in discharging from the transformer the energy stored in the transformer during the intervals 30 and 34. The discharge occurs through the secondary 18 and the tube 10.

During the time period 38, the transistor 12 continues nonconductive to the flow of current between its emitter and collector in a manner similar to its operation during the negative surge 36. During the time interval 38, the capacitor 21 continues to discharge through a circuit including the base and collector of the transistor 12 and the primary 19. At the end of the time interval 38, the circuit shown in FIGURE 1 is ready to institute a new cycle of operation by the production in the primary 19 of a voltage surge 30' corresponding to the surge 30.

During the period between the interval 30 and the time instant 37, a voltage is induced in the primary 19, as indicated in FIGURE 3. In this way, the circuit shown in FIGURE 1 acts as a blocking oscillator and produces a signal with a large percentage of harmonics because of the non-symmetrical relationship of the voltage produced in the primary 19. The voltage produced in the primary 19 is induced in the secondary winding 18 and is instrumental in producing a flow of current with a similar wave shape through the tube 10 to illuminate the tube. By providing a considerable percentage of harmonics in the signal produced in the transformer, the illumination of a fluorescent tube 10 is enhanced since the tube is responsive to signals at high frequencies because of the resonant characteristics of the tube. Since the circuit shown in FIGURE 1 can be adjusted to produce the signal shown in FIGURE 3 through a wide range of frequencies such as between 1,500 cycles per second and 30 kilocycles per second, the harmonics can be accordingly made to vary through a wide range of frequencies.

As will be seen, the circuit is operative with a minimum number of components to produce a cyclic voltage with the desired waveform. Furthermore, all of the components operate either as switches or provide inductive or capacitive reactances so that the electrical resistance of these components is quite low. On this basis, the only electrical resistance in the circuit is that essentially supplied by the tube 10. This is important in insuring that the circuit operates efficiently and that the battery 13 is able to operate for a relatively long period of time without having to be recharged. Furthermore, even the resonant circuit for the tube 10 is created with a minimum number of components since the stray capacitances in the secondary winding 18 and in the leads from the secondary winding cooperate with the secondary winding in producing the resonance.

It should be noted that one of the great underlying advances leading to the circuit of FIGURE 1 is the calculated employment of transient voltage jumps (generally considered spurious and undesirable) both at the switching device electrodes and at the transformer terminals. It is these transients which permit efficient operation with 1 to 2-volt batteries in spite of the unavoidable voltage drop across the switching device and the internal resistance of the transformer and other reactance elements. Thus, one circuit built according to the principles of the invention operated successfully even with a 1½-volt battery and a 0.7-volt drop across the transistor 12, because the transient voltage developed by the transistor 12 and across the primary 19 rose as high as 8 volts.

I have set up and successfully operated the circuit of the present invention with the following values and characteristics for the components illustrated. It should be clearly understood, however, these values are illustrative only:

Type tube 10—gas tube of any desired diameter and length
Type transistor 12—2N554
Voltage of battery source 13—1.25 volts
Type transformer 17:
- Secondary winding 18—1487 turns, #40 enamel covered wire
- Primary winding 19—20 turns #32 EC wire
- Primary winding 19*a*—16 turns #32 EC wire
- Core—ferrite cup with ¾ mil air gap (or equivalent)
- Capacitor 21—47 μfd. disc ceramic
- Type diode 22—100-volt peak inverse voltage; 200 ma. silicon diode It will be seen from the above that, when the primary 19 of the transformer 17 develops a potential of approximately 0 volts, the secondary 18 develops a potential of approximately 600 volts. With such a 1.25-volt battery source 13 and the necessary drop across the transistor of about 0.3 volt in theory, slightly less than 1-volt remains for usage. Accordingly, the characteristics of the invention that extremely large transients are generated and that the transistor interelectrode circuits are essentially free of resistance, other than that associated with the active and reactive components of the circuit, are very important. Further, these features relate to the remarkably high efficiency of the circuit, adapting it to practical use in flashlights and table lamps such as are used in restaurants, wherein long battery life is desired. By way of illustration, a fluorescent tube has been illuminated continuously for approximately 50 hours before the battery has had to be recharged.

The unusual performance of the transformer 17 is one important aspect of the above-described circuit. The transformer 17 and illuminating device 10 are capable of cooperating to assume a resonant condition over a very broad band of instantaneous operating points. This broadband capability is necessary not only because the power supplied by the circuit of FIGURE 1 is varied to vary the light output level of the tube 10, but also because the resonant characteristics of each tube 10 vary somewhat from the resonant characteristics of other tubes. The generation of signals rich in harmonics is desirable since the circuit can adjust to the different resonant characteristics of each tube 10 and provide frequencies which are attuned to the resonant characteristics of each individual tube. By winding the primary 19 and secondary 18 close together, the resistive losses in the transformer and the response time thereof are kept so insignificant that the impedance of the tube 10 is the main controlling factor as to resonant circuit behavior. Moreover, the decrease in tube resistance as it rises toward its stable illumination level imposes a further requirement of instantaneous adjustability in the resonant circuit including the tube 10 and transformer secondary 18.

Another important factor in the practice of applicant's invention is the proper availing of certain hereto disregarded characteristics of gas tube illumination devices where the input excitation signal to the illumination tube is an unsymmetrically waveform of the sort shown in FIGURE 3. It is clear that one input electrode to the tube is effectively an anode or positively charged electrode while the other input electrode is effectively a cathode or less positively (i.e.—negatively) charged electrode. In the usual practice of manufacturing such tubes, after the envelope and electrodes have been assembled, current is run through the electrodes until they are red hot and a partial vacuum is created in the tube by pumping the gases therein out usually from one end, in order to burn out contaminating oxidation. Since the first end, from which the pumping is done, achieves a far better vacuum during the electrode heating period than does the second, already-sealed end, the electrode at the pumping end will be far cleaner and more deoxidized than the electrode at the sealed end. Because this cleaner electrode will emit electrons far more readily, it is so significantly superior in the role of cathode that most tubes will not illuminate at all unless a clean electrode is electrically connected in the cathode position in the circuit; or, if a pure AC excitation signal is applied across the electrodes, the tube itself will vary the effect of it until it looks very similar to the waveform of FIGURE 3.

Figure 4:
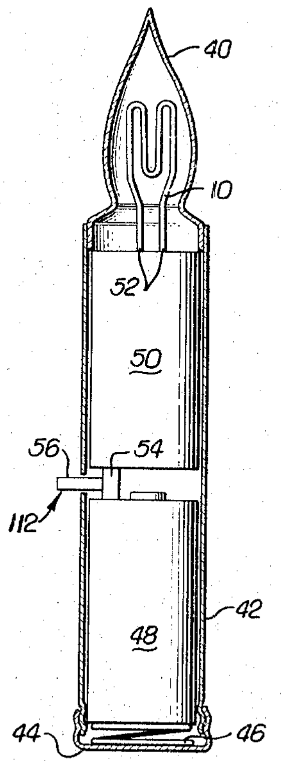
FIGURE 4 illustrates a miniature light system in imitation-candle form, according to the principles of the invention.

FIGURE 4 shows a type of small lamp constructed according to the principles of applicant's invention (and here shown as an imitation candle). The gas tube 10 discussed above is here made in the shape of a candle flame and the gas therein can be clear or any desired color. The flame or other shape can be achieved by surrounding the tube 10 with clear epoxy or the like as shown at 40. The lamp has an outer casing 42 which may have a cap 44 with spring 46 on the inside for urging a standard commercially available battery 48 of very small size and voltage upwards in the casing 42. In the interest of simplicity and durability, the casing 42 is made to serve as one of the conductors leading from the battery to the DC–AC converter circuit at 50. Since the casing 42 serves as one electrode and since the casing is fairly small, the casing may be considered to be a floating ground but not an actual ground.

The DC–AC converter circuit is constructed according to the principles discussed above and shown in FIGURE 1 and has its output coupled to the ends 52 of the tube 10. The circuit is so long-lived and reliable that the epoxy 40 would ordinarily be poured to include the tube 10 and circuit 50 in one solid unit. The switch 12 is preferably constructed by placing an eccentrically-shaped rotatable device of conductive material between the appropriate terminal of the battery 48 and an input terminal of the circuit 50. A 90° rotation of a shaft 56 attached to the eccentrically-shaped element 54 would cause it to make and break contact between the battery 48 and the circuit 50 depending on whether its long dimension was rotated to touch both terminals or whether its short dimension was rotated, leaving gaps between it and the terminals of the battery 48 and circuit 50. As an alternative switch arrangement, of course, the element 54 could be made a connecting contact and the shaft 56 be adapted to be pulled in and out, pushing the connecting contact into and out of electrical connection with the terminals of both the battery 48 and the circuit 50.

The imitation-candle lamp of FIGURE 4 illustrates the great usefulness of the principles of applicant's invention in providing illumination far superior to that possible with incandescent bulbs for use in small and inexpensive elements such as flashlights and battery-operated table lamps. Using a rechargeable type battery 48, a lamp of the sort shown in FIGURE 4 can be run with good illumination for about 50 hours and thus can be used for restaurant lighting continuously throughout several working days and put in a recharging rack after each cycle of 50 hours of use. Even with such lengthy continuous performance, however, such a unit need be no longer than the size of two D-size storage cells laid end-to-end; yet the illumination produced far transcends that of the usual plug-in table lamp.

Thus, there has been achieved an improved DC–AC converter which is usable to power luminescent gas tubes from small voltage batteries without requiring a heavier or bulkier package than that presently used by incandescent lighting systems. It should be noted that a DC–AC converter according to the present invention replaces not only prior converters, but also the separate ballast and starter systems heretofore used with the luminescent tubes. Moreover, the new circuit disclosed herein is unique in its capability of deriving the high AC voltage necessary for a wide range of utilization devices from small battery voltages down to one or two volts DC.

While only one embodiment of the present invention is disclosed and described herein, it will be readily apparent to persons skilled in the art that numerous changes and modifications may be made thereto without departing from the spirit of the invention. Accordingly, the foregoing disclosure, including the drawings and description thereof, are for illustrative purposes only and do not in any way limit the invention which is defined only by the claims which follow.

What is claimed is:

1. In combination for providing illumination with a minimum loss of energy;
   - a tube constructed to provide illumination when periodically energized;
   - first switching means having conductive and non-conductive states and constructed to be triggered to the conductive state upon each introduction of a particular voltage to the first switching means;
   - a source of direct voltage;
   - first means operatively coupled to the first switching means and to the tube and to the source of direct voltage for periodically obtaining the introduction of the particular voltage to the first switching means to make the first switching means conductive and to provide for an energizing of the tube;
   - second switching means operatively coupled to the first switching means and having conductive and non-conductive states and cooperative with the first means in the non-conductive state for providing for a controlled period of conductivity in the first switching means upon each introduction of the particular voltage to the first switching means to make the first switching means conductive and cooperative with the first means in the conductive state for providing for the non-conductive state in the first switching means after each introduction of the particular voltage to the first switching means; and
   - means operatively coupled to the second switching means for obtaining the production of the conductive state in the second switching means a particular time after the production of the conductive state in the first switching means.

2. The combination set forth in claim 1 wherein:
   - the first switching means has an electrical resistance of low value in the conductive state and wherein:

the second switching means has conductive and non-conductive states and has an electrical resistance of low value in the conductive state and wherein the first switching means is in the conductive state during most of the controlled period of non-conductivity in the second switching means and wherein:

the first means has an electrical reactance and the second means has an electrical reactance.

3. In combination for providing illumination with a minimum loss of energy;

a source of direct voltage of a particular magnitude;

first switching means having conductive and non-conductive states and having a low impedance in the conductive state and an impedance approaching infinity in the non-conductive state;

second switching means having conductive and non-conductive states and connected to the first switching means to make the first switching means conductive in the non-conductive state of the second switching means and to bias the first switching means toward a state of non-conductivity in the conductive state of the second switching means, the second switching means having a low impedance in the conductive state and an impedance approaching infinity in the non-conductive state;

first reactance means constructed to store energy and operatively coupled to the source of direct voltage and to the first and second switching means for initially making the first switching means conductive and the second switching means non-conductive on a periodic basis and for producing a flow of current through the first switching means and the first reactance means during the conductivity of the first switching means and for storing energy in the first reactance means in accordance with such flow of current;

second reactance means constructed to store energy and operatively coupled to the first reactance means and to the first and second switching means for storing energy in the second reactance means during the flow of energy through the first switching means and for converting the second switching means to the conductive state upon the storage of a particular amount of energy in the second reactance means and for obtaining a discharge of the energy stored in the first reactance means upon each conversion of the second switching means to the conductive state; and a tube operatively coupled to the first reactance means to become illuminated during each charge of energy in the first reactance means and each discharge of energy from the first reactance means.

4. The combination set forth in claim 3, wherein the first reactance means is inductive and the second reactance means is capacitive.

5. In combination for providing illumination with a minimum loss of energy;

a source of direct voltage;

first switching means having conductive and non-conductive states and having a low impedance in the conductive state and an impedance approaching infinity in the non-conductive state, the first switching means being at a floating potential;

second switching means having conductive and non-conductive states and having a low impedance in the conductive state and an impedance approaching infinity in the non-conductive state, the second switching means being at a floating potential;

the second switching means being connected to the first switching means to bias the first switching means toward the state of conductivity in the non-conductive state of the second switching means and to bias the first switching means toward the state of non-conductivity in the conductive state of the second switching means;

reactive means operatively coupled to the source of direct voltage and to the first and second switching means for providing a cyclic operation to initially obtain the state of conductivity of the first switching means and the state of non-conductivity of the second switching means in each cycle for a flow of current through the first switching means and the reactive means and for a storage of energy in the reactive means and thereafter to obtain in each cycle the state of non-conductivity of the first switching means and the state of conductivity of the second switching means for a subsequent discharge of the energy stored in the reactance means, the reactance means being at a floating potential; and a tube constructed to provide illumination when cyclically energized and operatively coupled to the reactance means and disposed at a floating potential to become energized in each cycle during the storage of energy in the reactance means and during the subsequent discharge of such stored energy from the reactance means.

6. The combination set forth in claim 5, wherein the reactive means includes:

a transformer having a primary electrically disposed at a floating potential and a secondary electrically disposed at a floating potential and wherein the secondary is connected to the tube and the primary is operatively coupled to the source of direct voltage and the first and second switching means.

7. In combination for providing illumination;

a lamp having a hollow base;

a casing disposed within the base and providing a floating potential;

a source of direct voltage, the source being disposed within the base and having first and second terminals at floating potentials;

a tube constructed to provide illumination when periodically energized, the tube extending from the casing to provide illumination for the lamp;

switch means having operative and inoperative relationships; and circuit means disposed within the casing and operatively coupled to the switch means, the tube and the source of direct voltage to couple the first terminal of the source to the circuit means and the second terminal of the source to the casing and the circuit means in the operative relationship of the switch for obtaining periodic energizing of the tube.

8. The combination set forth in claim 7 wherein:

the circuit means and the source are disposed within the casing in spaced relationship and wherein the switch means extend into the casing to a position between the source and the circuit means for electrically coupling the second terminal of the source to the circuit means and the casing in the operative relationship of the switch means and for electrically isolating the second terminal of the source relative to the circuit means and the casing in the inoperative relationship of the switch means.

9. A lighting circuit comprising:

an AC responsive illuminating device having an input electrode;

a transformer having primary and secondary, the secondary of the transformer being electrically connected to the input electrode of the AC-responsive illuminating device and the primary of the transformer having first and second ends and a tap between the first and second ends;

a power source having first and second terminals, the first terminal of the power source being electrically connected to the tap on the primary of the transformer;

a transistor having an emitter, collector and control electrode and having conductive and non-conductive states, the collector of the transistor being electrically connected to the first end of the primary of the transformer and the emitter of the transistor being electrically connected to the second end of the power source;

means electrically connected between the second end of the primary of the transformer and the control electrode of the transistor for utilizing the voltage appearing on the second end of the primary of the transformer in the non-conductive state of the transistor for deriving a signal to be applied to the control electrode of the transistor to make the transistor conductive; and means coupled between the control electrode of the transistor and the emitter of the transistor for switching the transistor into its non-conductive state in response to the signals produced on the emitter and control electrode of the transistor when it is in its conductive state.

10. The lighting circuit set forth in claim 9 wherein a capacitance is connected between the second end of the primary of the transformer and the control electrode of the transistor and a diode is connected between the emitter and the control electrode of the transistor.

11. A lower-power, high efficiency lighting circuit for deriving a high-voltage AC excitation signal from a low-voltage DC source having first and second reference terminals for application to the input electrode of an AC-responsive illuminating device comprising:

a transistor having emitter, base and collector and having conductive and non-conductive states, the emitter of the transistor being coupled to the first reference terminal of the low-voltage DC source;

a transformer having primary and secondary, the primary having a first end, a second end and an intermediate point, the first end of the primary of the transformer being coupled to the collector of the transistor, the intermediate point of the primary of the transformer being coupled to the second reference terminal of the low-voltage DC source and the secondary of the transformer being coupled to the input electrode of the AC-responsive illuminating device;

a charging capacitor coupled between the second end of the primary of the transformer and the base of the transistor for applying a variable voltage signal to the base of the transistor whereby the transistor is alternately switched between the conductive and non-conductive states; and means for discharging the charging capacitor when the voltage on the base of the transistor rises above the voltage on the first reference terminal of the low voltage DC source.

12. A low-power, high-efficiency lighting circuit for deriving a high-voltage AC excitation signal from a DC source having first and second reference terminals for application to the input electrode of an AC-responsive illuminating device, comprising:

a first switching device having input, control, and output electrodes and having conductive and non-conductive states, the input electrode of the first switching device being coupled to the first reference terminal of the DC source;

a transformer having primary and secondary, the primary having first and second end terminals and an intermediate point, the first end of the primary of the transformer being coupled to the output electrode of the first switching device, the intermediate point of the primary of the transformer being coupled to the second reference terminal of the DC source, and the secondary of the transformer being coupled to the input electrode of the AC-responsive illuminating device;

a charging capacitor coupled between the second end of the primary of the transformer and the control electrode of the first switching device for applying a variable voltage signal to the control electrode of the first switching device to become charged during the conductive state in the first switching device; and a second switching device connected between the control and input electrodes of the first switching device to provide a discharge path for the charging capacitor and to produce the non-conductive state in the first switching device upon a discharge of the charging capacitor through the second switching device.

13. A lighting system comprising:

a base;

a hollow casing mounted on the base;

a source of direct voltage disposed within the casing and having first and second terminals, the first terminal of the direct voltage being electrically connected to the casing;

an AC-responsive illuminating device constructed to provide illumination when periodically energized, the illuminating device extending from the casing to provide illumination for the lighting system and being electrically connected to the casing;

switch means electrically connected to the second terminal of the direct voltage source and having operative and inoperative modes;

a first switching device having input, control, and output electrodes and having conductive and non-conductive states, the input electrode of the first switching device being coupled through the casing to the first reference terminal of the direct voltage source;

a transformer having primary and secondary, the transformer having first and second ends and an intermediate point, the first end of the primary of the transformer being coupled to the output electrode of the first switching device, the intermediate point of the primary of the transformer being coupled through the switch means to the second reference terminal of the direct voltage source when the switch means is in an operative mode, and the secondary of the transformer being coupled to the AC-responsive illuminating device;

charging means coupled between the second end of the primary of the transformer and the control electrode of the first switching device for applying a variable voltage signal to the control electrode of the first switching device to produce the conductive state and to provide a charging of the charging means during the production of the conductive state in the first switching device; and a second switching device connected between the input and control electrodes of the first switching device for providing a discharge of the charging means upon a charge of the charging means to a particular value to produce the non-conductive state in the first switching device.

14. A lighting system comprising:

a base;

a hollow casing mounted on the base and serving as an electrical conductor;

a source of direct voltage disposed within the casing and having first and second terminals, the first terminal of the direct voltage source being electrically connected to the casing as a conductor;

an AC-responsive illuminating device constructed to provide illumination when periodically energized, the illuminating device extending from the casing to provide illumination for the illuminating device and being electrically connected to the casing;

switch means electrically connected to the second terminal of the direct voltage source and having operative and inoperative modes;

a switching device having conductive and non-conductive states and having input, control, and output electrodes, the input electrode of the switching device being coupled through the casing to the first terminal of the direct voltage source;

a transformer having primary and secondary, the primary having first and second ends and an intermediate point, the first end of the primary of the transformer being coupled to the output electrode of the switching device, the intermediate point of the primary of the transformer being coupled through the switch means to the second reference terminal of the direct voltage source, and the secondary of the transformer being coupled to the AC-responsive illuminating device;

a capacitor coupled between the second end of the primary of the transformer and the control electrode of the switching device for applying a variable voltage signal to the control electrode of the switching device to produce the conductive state in the switching device and the charging of the capacitor during the conductive state in the switching device; and a unidirectional conductive device connected between the input and control electrodes of the switching device to discharge the capacitor and to hold the switching device in its non-conductive state when the voltage on the control electrode reaches a particular level relative to the voltage on the first reference terminal of the DC source.

15. In combination for providing illumination:

a lamp having a hollow base;

a casing disposed within the base and providing a floating potential;

a source of direct voltage, the source being disposed within the base and having first and second reference terminals at floating potentials, the first terminal being electrically connected to the casing;

an AC-responsive illuminating device constructed to provide illumination when periodically energized, the tube extending from the casing to provide illumination for the lamp;

a switching device having cut-off and conductive modes coupled through the casing to the first reference terminal of the direct voltage source;

a transformer having primary and secondary, the primary having first and second ends and an intermediate point, the first end of the primary of the transformer being coupled to the switching device, the intermediate point of the primary of the transformer being electrically connected to the second reference terminal of the direct voltage source, and the secondary of the transformer being coupled to the AC-responsive illuminating device; and charge means coupled between the second end of the primary of the transformer and the switching device for applying a variable voltage signal to the switching device to obtain the conductive state in the switching device and a charging of the charge means during the production of the conductive state in the switch means; and control means having conductive and non-conductive states and connected between the switching device and the first reference terminal of the source to become conductive upon a charge of the charge means to a particular value and to produce the non-conductive state in the switching device upon becoming conductive, the primary of the transformer being connected to the switching device to produce a surge of voltage for instituting the conductivity of the switching device upon the production of the state of non-conductivity in the switching device.

16. A low-loss oscillator circuit for converting direct current input power to an alternating current output signal comprising:

a source of direct voltage;

first switching means having conductive and non-conductive states and having a low impedance in the conductive state and an impedance approaching infinity in the non-conductive state, the first switching means being at a floating potential;

second switching means having conductive and non-conductive states and having a low impedance in the conductive state and an impedance approaching infinity in the non-conductive state, the second switching means being at a floating potential;

the second switching means being connected to the first switching means to bias the first switching means toward the state of conductivity in the non-conductive state of the second switching means and to bias the first switching means toward the state of non-conductivity in the conductive state of the second switching means; and reactive means operatively coupled to the source of direct voltage and to the first and second switching means for providing a cyclic operation to initially obtain the state of conductivity of the first switching means and the state of the non-conductivity of the second switching means in each cycle for a flow of current through the first switching means and the reactive means and for a storage of energy in the reactive means and thereafter to obtain in each cycle the state of non-conductivity of the first switching means and the state of conductivity of the second switching means for a subsequent discharge through the first switching means of the energy stored in the reactive means, the reactive means being at a floating potential.

17. A low-power, high-efficiency oscillator circuit for deriving a high-voltage AC excitation signal from a low-voltage DC source having first and second reference terminals for application to the input electrode of an AC utilization device, comprising:

a switching device having conductive and cut-off states, the switching device being coupled to the first reference terminal of the low-voltage DC source;

a transformer having primary and secondary, the primary having first and second ends and an intermediate point, the first end of the primary of the transformer being coupled to the switching device, the intermediate point of the primary of the transformer being coupled to the second reference terminal of the low-voltage DC source, and the secondary of the transformer being coupled to the input electrode of the AC utilization device;

A capacitor coupled between the second end of the primary of the transformer and the switching device for applying a variable voltage signal to the switching device to produce the conductive state in the switching device and a charge of the capacitor during the conductive state in the switching device;

means coupled between the switching device and the first reference terminal for periodically discharging the charging capacitor and obtaining the operation of the switching device in the non-conductive state during the discharge of the capacitor.

18. In combination for illuminating a luminescent tube, a source of direct voltage, a first current control member having conductive and non-conductive states, a second current control member having conductive and non-conductive states, first reactance means constructed to store energy, second reactance means constructed to store energy, means connected in electrical circuitry with the first and second reactance means and the source of direct voltage to bias the first current control member to the state of conductivity and to obtain a storage of energy in the first reactance means and a storage of energy in the second reactance means during the state of conductivity in the first current control member, means connected in electrical circuitry with the first and second reactance means and the second current control member for producing a discharge through the second current control member of the energy stored in the second reactance means upon the storage of a particular amount of energy in the second reactance means to bias the first current control member to the state of non-conductivity during the discharge of the energy in the second reactance means through the second current control member and to obtain the state of conductivity in the first current control member after such discharge, and means connecting the luminescent tube to the first reactance means to obtain a flow of current through the first reactance means and the luminescent tube during the state of conductivity in the first current control member and to obtain a discharge through the luminescent tube of the energy stored in the first reactance means upon the state of non-conductivity in the first current control member.

References Cited

UNITED STATES PATENTS

| | | | |
|---|---|---|---|
| 2,895,081 | 7/1959 | Crownover et al. | 315—100 |
| 2,964,676 | 12/1960 | Davies et al. | 315—100 |
| 2,982,881 | 5/1961 | Reich | 315—100 |
| 3,016,478 | 1/1962 | Kadell | 315—100 |
| 3,036,299 | 5/1962 | Uphoff | 331—112 |

JOHN W. HUCKERT, *Primary Examiner.*

R. F. POLISSACK, *Assistant Examiner.*